(12) United States Patent
Cadell et al.

(10) Patent No.: US 10,304,570 B2
(45) Date of Patent: May 28, 2019

(54) FASTENERS FOR NUCLEAR REACTOR SYSTEMS

(71) Applicant: NuScale Power, LLC, Corvallis, OR (US)

(72) Inventors: Seth Cadell, Corvallis, OR (US); Tamas R. Liszkai, Corvallis, OR (US)

(73) Assignee: NuScale Power, LLC, Corvallis, OR (US)

( * ) Notice: Subject to any disclaimer, the term of this patent is extended or adjusted under 35 U.S.C. 154(b) by 286 days.

(21) Appl. No.: 15/055,336

(22) Filed: Feb. 26, 2016

(65) Prior Publication Data

US 2016/0260505 A1 Sep. 8, 2016

(51) Int. Cl.
| | |
|---|---|
| *G21C 3/33* | (2006.01) |
| *G21C 5/10* | (2006.01) |
| *G21C 13/02* | (2006.01) |
| *G21C 19/19* | (2006.01) |
| *G21C 11/06* | (2006.01) |

(52) U.S. Cl.
CPC .............. *G21C 3/331* (2013.01); *G21C 5/10* (2013.01); *G21C 13/02* (2013.01); *G21C 19/19* (2013.01); *G21C 11/06* (2013.01); *Y02E 30/40* (2013.01)

(58) Field of Classification Search
CPC . G21C 3/33; G21C 3/331; G21C 3/00; G21C 3/30; G21C 3/32; G21C 19/19
See application file for complete search history.

(56) References Cited

U.S. PATENT DOCUMENTS

| | | | | |
|---|---|---|---|---|
| 2,512,644 A | * | 6/1950 | Hauber | F02M 49/02 123/435 |
| 3,079,323 A | | 2/1963 | Hawke | |

(Continued)

FOREIGN PATENT DOCUMENTS

| | | |
|---|---|---|
| CN | 1047752 | 12/1990 |
| CN | 1051452 | 5/1991 |

(Continued)

OTHER PUBLICATIONS

Authorized Officer Hye Lyun Park, International Search Report for International Application No. PCT/US2016/019923, dated Jun. 27, 2016, 3 pages.

(Continued)

*Primary Examiner* — Lily C Garner
(74) *Attorney, Agent, or Firm* — Fish & Richardson P.C.

(57) ABSTRACT

Various embodiments are directed towards a nuclear latch assembly. The assembly includes a latch housing and a latch mechanism. The latch mechanism includes a projection member. The latch mechanism provides a biasing force on the projection member. Unless an opposing force on the projection member counterbalances the biasing force, the projection member at least partially projects from a surface of the latch housing. The assembly may include a biasing member that provides the biasing force on the projection member. The assembly may include a bolt. The bolt includes a longitudinal axis. A bore included in the housing is sized to receive the bolt. When the bore receives the bolt, the housing is rotatable about the longitudinal axis of the bolt. The latch mechanism includes a side bore that receives the projection member, the biasing member, and a disk intermediate the projection member and the biasing member.

20 Claims, 7 Drawing Sheets

(56) References Cited

U.S. PATENT DOCUMENTS

| | | | | |
|---|---|---|---|---|
| 3,823,065 A | * | 7/1974 | Jones | G21C 3/326 |
| | | | | 250/506.1 |
| 4,550,941 A | | 11/1985 | Veronesi et al. | |
| 4,815,697 A | * | 3/1989 | Skoda | F16K 17/042 |
| | | | | 251/364 |
| 5,228,732 A | * | 7/1993 | Rauscher | H05K 13/0408 |
| | | | | 29/743 |
| 5,265,141 A | * | 11/1993 | Kobsa | G21C 13/02 |
| | | | | 376/302 |
| 5,638,216 A | | 6/1997 | Horiuchi et al. | |
| 2003/0135975 A1 | | 7/2003 | Abbott et al. | 29/525.02 |
| 2006/0008045 A1 | | 1/2006 | Forsyth et al. | 376/294 |

FOREIGN PATENT DOCUMENTS

| | | | |
|---|---|---|---|
| CN | 1914692 | 2/2007 | |
| CN | 101681684 | 3/2010 | |
| JP | 04-164292 | 6/1992 | G21C 7/16 |
| WO | 2009/045640 | 4/2009 | G21C 1/04 |

OTHER PUBLICATIONS

Authorized Officer Hye Lyun Park, International Preliminary Report on Patentability and Written Opinion International Application No. PCT/US2016/019923, dated Sep. 5, 2017, 6 pages.

European Extended Search Report in European Application No. 16759310.2, dated Oct. 11, 2018, 8 pages.

Chinese Office Action in Chinese Application No. 201680013403.7, dated Feb. 22, 2019, 14 pages with English Translation.

\* cited by examiner

FASTENERS FOR NUCLEAR REACTOR SYSTEMS

STATEMENT REGARDING GOVERNMENT INTERESTS

This invention was made with Government support under Cooperative Agreement No. DE-NE0000633 awarded by DOE. The Government has certain rights in this invention.

PRIORITY CLAIM

This patent application claims the benefit of U.S. Provisional Patent Application Ser. No. 62/127,608, entitled NUCLEAR CORE SUPPORT FASTENER, filed on Mar. 3, 2015, the contents of which are hereby incorporated by reference.

FIELD OF THE INVENTION

This disclosure generally relates to nuclear reactors and, more particularly, but not exclusively to fasteners and couplers for nuclear reactor systems.

BACKGROUND OF THE INVENTION

Pressurized water reactors include nuclear fuel assemblies. When positioned within a reactor pressure vessel of a nuclear reactor module, the nuclear fuel assemblies may be supported by a baffle plate with reinforcement ribs, such as a former plate. The baffle plate typically surrounds and provides lateral support for the nuclear fuel assemblies. This structure is typically referred to as a core barrel, baffle-former-barrel assembly, or the core shroud. The baffle plate may be assembled in either bolted assemblies or welded assemblies. Vertical restraint of the nuclear fuel assemblies is accomplished with the upper and lower core plates. In some instances, the baffle plate provides a secondary function of reflecting fast neutrons back into the core. It is for these and other concerns that the following disclosure is provided.

SUMMARY OF THE INVENTION

Various embodiments are directed towards a nuclear latch assembly. The latch assembly includes a latch housing and a latch mechanism. The latch mechanism includes a projection member. The latch mechanism provides a biasing force on the projection member. Unless an opposing force on the projection member counterbalances the biasing force, the projection member at least partially projects from a surface of the latch housing. In some embodiments, the projection member may be a spheroidal member. The latch assembly further includes a biasing member that provides the biasing force on the spheroidal member.

In at least one embodiment, the latch assembly further includes a cylindrical member. The cylindrical member includes a longitudinal axis. A bore included in the latch housing is sized to receive the cylindrical member. When the bore receives the cylindrical member, the latch housing is rotatable about the longitudinal axis of the cylindrical member. The cylindrical member may be a bolt. The latch mechanism may further include a side bore that receives the projection member, a biasing member that provides the biasing force on the projection member, and a disk intermediate the projection member and the biasing member.

In some embodiments, the latch mechanism further includes a biasing member that provides the biasing force on the projection member. The latch mechanism may also include an adjusting member that enables an adjustment of the biasing force by adjusting a pre-load on the biasing member. The adjusting member may be a setscrew. The latch assembly may include a nut and a washer. The washer is disposed intermediate the nut and the latch housing. The washer decouples a rotation of the latch housing from a rotation of the nut.

In at least one embodiment, when the projection member at least partially projects from the surface of the latch housing such that the projection member is disposed adjacent another surface, the projection member transfers at least a portion of the biasing force to the other surface. Transferring the biasing force results in a frictional torque. To rotate the latch housing about a rotational axis that is substantially transverse to the surface of the latch housing, a minimum torque that overcomes the frictional torque must be applied to the latch housing.

Some embodiments are directed towards a nuclear reactor system. The nuclear reactor system may include a support plate and a latch assembly. The support plate includes a flange that extends in a generally radial direction beyond a perimeter of the support plate. The flange includes an aperture with a longitudinal aperture axis. The latch assembly includes a latch housing with a longitudinal latch axis. The latch housing is disposed above the flange. The latch housing may be configured and arranged for at least a first and a second rotational orientation. When the latch housing is in the first rotational orientation, the longitudinal latch axis is substantially aligned with the longitudinal aperture axis of the flange. Furthermore, the latch housing may be receivable through the aperture of the flange such that the latch housing does not restrain an upward displacement of the support plate. In contrast, when the latch housing is in the second rotational orientation, the longitudinal latch axis is substantially transverse to the longitudinal aperture axis. Furthermore, the latch housing is not receivable through the flange such that the latch housing restrains the upward displacement of the support plate.

In some embodiments, the system further includes a core barrel. The core barrel includes a support block that extends in a generally radial direction beyond a perimeter of the core barrel. The flange of the support plate is disposed vertically intermediate the support block and the latch housing. The support block restrains a downward displacement of the support plate. When the latch housing is in the first rotational orientation, the support plate is secured and/or locked to the core barrel.

In various embodiments, the latch assembly further includes an elongate member. The elongate member extends through the flange and a main bore of the latch housing. The latch housing rotates about the elongate member between the first and the second rotational orientations. The elongate member may be a bolt. A relative angular difference between the first and the second rotational orientations of the latch housing may be approximately 90 degrees.

In at least one embodiment, an upper surface of the flange includes an indent. When the latch housing is in the second rotational orientation, the indent receives at least a portion of a latch mechanism that is projecting from a lower surface of the latch housing. When received by the indent, the portion of the latch mechanism projecting from the lower surface of the latch housing resists a rotation of the latch housing away from the second rotational orientation. In various embodiments, the system further includes a latch mechanism. The latch mechanism is at least partially housed within the latch housing. The latch mechanism includes at least a spheroidal member, a biasing member that provides a biasing force on the spheroidal member, and a setscrew to adjust a magnitude of the biasing force. The setscrew may be an adjusting mechanism. One system may also include a nut disposed above the latch housing. The nut restrains an upward displacement of the latch housing.

Some embodiments are directed towards an apparatus for supporting a nuclear reactor core. The apparatus includes a core barrel, a support plate, and a latch assembly. The core barrel at least partially surrounds the nuclear reactor core. The latch assembly includes a latch housing. A first rotation of the latch housing securely couples the support plate to the core barrel. A second rotation of the latch housing decouples the support plate from the core barrel. Each of the first rotation and the second rotation of the latch housing is less than 180 degrees.

In at least one embodiment, the support plate is an upper support plate that is positioned above the core barrel. In other embodiments, the support plate is a lower support plate that is positioned below the core barrel. The latch housing includes a first asymmetric shape. The support plate includes an aperture with a second asymmetric shape. When the latch housing is rotated to the second rotation, the first asymmetric shape of the latch housing is aligned with the second asymmetric shape of the aperture. When the latch housing is rotated to the first rotation, the first asymmetric shape of the latch housing is anti-aligned with the second asymmetric shape of the aperture.

When the first and the second asymmetric shapes are aligned, the latch housing is receivable by the aperture of the support plate. When the first and the second asymmetric shapes are anti-aligned, the latch housing is not receivable by the aperture. The support plate may include an indent that resists the second rotation of the latch housing. The core barrel includes a support block. A portion of the support plate is vertically intermediate the latch housing and the support block. In at least one embodiment, the apparatus includes a tool. The tool is remotely actuated to rotate the latch housing at least one of the first rotation or the second rotation.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Various embodiments are described more fully hereinafter with reference to the accompanying drawings, which show, by way of illustration, specific embodiments by which the invention may be practiced. The embodiments may, however, be embodied in many different forms and should not be construed as limited to the embodiments set forth herein. Among other things, the various embodiments may be methods, systems, media, or devices. The following detailed description should, therefore, not be limiting.

Throughout the specification and claims, the following terms take the meanings explicitly associated herein, unless the context clearly dictates otherwise. The term "herein" refers to the specification, claims, and drawings associated with the current application. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise.

This disclosure describes embodiments of a support structure for one or more nuclear reactor systems. In various embodiments, a support structure may include one or more latch assemblies that couple components of the support structure. The support structure may include a core barrel, upper support plate, and a lower support plate, as well as other components. In some embodiments, a latch assembly may be transitioned between a locked and unlocked state. When in the locked state, the latch assembly couples and locks two or more components. In at least one embodiment, when in the locked state, a latch assembly couples and locks a support plate to the core barrel. The latch assembly may be transitioned between the locked and unlocked states by rotating a latch housing of the latch assembly less than 360 degrees. In at least one embodiment, the latch assembly may be transitioned between the locked and unlocked states by rotating the latch housing approximately 90 degrees. The latch assembly may be biased to remain in the locked position. Thus, a minimum torque is required to transition the latch assembly back to the unlocked state. Such a biasing reduces the likelihood of unintended transitions from the locked state to the unlocked state. In some embodiments, a portion of the latch assembly is biased to interface with a portion of the nuclear reactor system in the locked position.

Various embodiments may include, in any combination, none, one, some, or all of the features described herein. At least because of the biasing discussed above, a latch assembly may remain in the locked state under large loads, such as but not limited to loads generated by seismic event. Furthermore, the latch assembly may facilitate efficient access to a reactor core during refueling outages. Thus, the various embodiments of latch assemblies may be more efficient than conventional fasteners, such as but not limited to fasteners such as bolts, screws, and the like. The fasteners may be threaded fasteners. In some embodiments, the latch assembly may facilitate the efficient removal of reactor system components for periodic inspection. Accordingly, the latch assembly may be more efficient than conventional fasteners.

Various embodiments of latch assemblies decrease a number of fasteners required to couple two or more reactor system components. For instance, in at least one embodiment, four latch assemblies may be employed to couple two or more reactor system components.

In at least some embodiments, the latch assemblies may include relatively physically small components. Accordingly, various embodiments of latch assemblies described herein only minimally impact the flow of reactor coolant, such as but not limited to the primary coolant. For example, when coupling the core support components at an exterior of the core support assembly, a latch assembly may decrease blockage of the primary coolant flow through an interior flow path of a reactor core. Various embodiments of latch assemblies may decrease blockage of the primary coolant flow in an annulus between the core support assembly and a reactor pressure vessel by, for instance, being sufficiently small to reside between the reactor vessel and a core barrel. The latch assemblies enable coupling of the components of the core support assembly with a decreased number of latch assemblies. For instance, two components may be securely coupled by employing eight latch assemblies. In some embodiments, the latch assembly may be actuated remotely. Thus, disassembly of the core support assembly may occur by transitioning one or more latch assemblies to an unlocked position, without the need for automated tooling or divers.

The details of one or more implementations of the subject matter described in this specification are set forth in the accompanying drawings and the description infra. Other features, aspects, and advantages of the subject matter will become apparent from the description, the drawings, and the claims.

Figure 1:
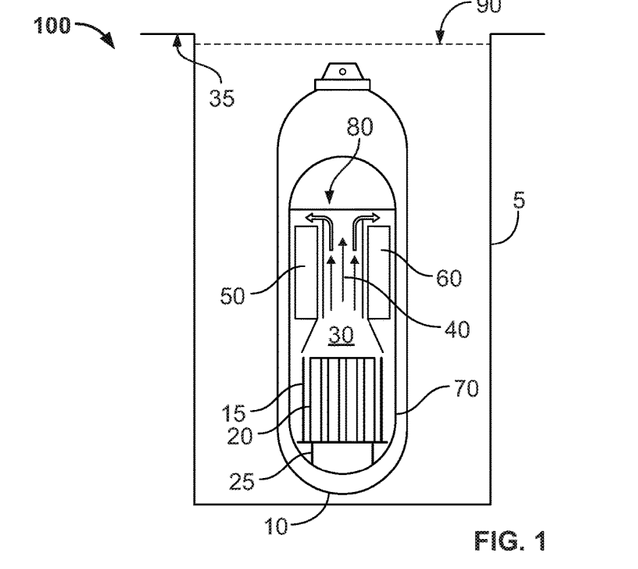
FIG. 1 is a schematic diagram illustrating an exemplary embodiment of nuclear reactor system.

FIG. 1 is a schematic diagram of a nuclear reactor system 100 (a nuclear reactor) that includes a core support assembly 25 and a neutron reflector 15. In some embodiments, the nuclear reactor system 100 is a commercial power pressurized water reactor that utilizes natural circulation of a primary coolant 40 to cool a nuclear core 20 and transfer heat from the nuclear core 20 to a secondary coolant through one or more heat exchangers 50, 60. Transferring heat to a secondary coolant may generate steam or superheated steam. In various embodiments, the secondary coolant may include at least water. The steam can drive power generation equipment, such as but not limited to steam turbines. Upon transferring energy to the power generation equipment, the secondary coolant is condensed and returned to the one the nuclear core 20 for reheating. In some embodiments, the core support assembly 25 may include one or more latch assemblies, such as but not limited to latch assembly 219 of FIG. 2A or latch assembly 319 of FIGS. 3A-3F. Various embodiments of latch assemblies mechanically couple one or more components of nuclear reactor system 100, such as but not limited to core support assembly 25. Accordingly, a latch assembly may be a coupler. In at least one embodiment, a latch assembly is a fastener.

With respect to the nuclear reactor system 100 of FIG. 1, reactor core 20 is positioned at a bottom portion of a cylinder-shaped or capsule-shaped reactor vessel 70. In various embodiments, reactor core 20 includes a plurality of nuclear fuel assemblies and a plurality of control rods. The nuclear fuel assemblies include fissile material. The fissile material may undergo a nuclear reaction, such as but not limited to a fission reaction, when the nuclear fuel assemblies and the control rods are positioned sufficiently apart. In this way, actively controlling the position of the control rods enables controlling at least a rate of the nuclear reaction, and thus a rate of power generation.

In some embodiments, the operation of nuclear reactor system 100 is at least partially a passive operation. For instance, nuclear reactor system 100 may lack circulation pumps that circulate the primary coolant. Rather, nuclear reactor system 100 may at least partially exploit the laws of physics to ensure that the safe operation of the nuclear reactor system 100 is maintained during normal operating and emergency conditions, without operator intervention or supervision, at least for some period of time which may be predefined. For instance, the flow of at least primary coolant 40 may be driven by convection.

A cylinder-shaped or capsule-shaped containment vessel 10 surrounds reactor vessel 70 and is partially or completely submerged in a reactor pool, such as below waterline 90. As shown in FIG. 1, in some embodiments, waterline 90 may be at or just below a top surface 35 of reactor bay 5. The volume between reactor vessel 70 and containment vessel 10 may be partially or completely evacuated to reduce heat transfer from reactor vessel 70 to the reactor pool. However, in other embodiments, the volume between reactor vessel 70 and containment vessel 10 may be at least partially filled with a gas or a liquid (or both) that increases heat transfer between the reactor vessel 70 and containment vessel 10. The reactor vessel 70 may house primary coolant 40 up to the coolant line 80.

In the embodiment shown in FIG. 1, reactor core 20 is submerged within a liquid, such as but not limited to water. The liquid may include boron or other additives. The primary coolant 40 within or adjacent nuclear core 20 is heated via heat generated by nuclear core 20. The heated primary coolant 40 flows generally upward, via convection, into channel 30 after making contact with a surface of the reactor core 20. The generally upward flow of heated primary coolant 40 is represented by arrows within primary coolant 40 located within the channel 30 of the riser. The primary coolant 40 provides heat to heat exchangers 50 and 60 and is cooled as it travels across heat exchangers 50 and 60. After emerging from the top of heat exchangers 50 and 60, the cooled primary coolant 40 flows generally downward, primarily driven by a density differential along the inner walls of reactor vessel 70. Such a convective flow of primary coolant 40 enables a heat exchange from to primary coolant 40 to heat exchangers 50 and 60. Upon reaching the bottom portion of the reactor vessel 70, primary coolant 40 is again in thermal contact with reactor core 20 and is re-heated. Re-heated primary coolant 40 again flows generally upward through channel 30 to continue the convective flow cycle. Although heat exchangers 50 and 60 are shown as two distinct elements in FIG. 1, heat exchangers 50 and 60 may represent any number of coils, such as but not limited to helical coils that wrap around at least a portion of riser.

To summarize the above discussion, normal operation of nuclear reactor system 100 proceeds in a manner wherein heated primary coolant 40 rises through channel 30 in the riser and makes thermal contact with heat exchangers 50 and 60. When in thermal contact with heat exchangers 50 and 60, primary coolant 40 provides at least a portion of its thermal energy to heat exchangers 50 and 60 and somewhat cools.

The somewhat cooled primary coolant 40 sinks towards the bottom of reactor vessel 70. In the exemplary embodiment shown in FIG. 1, primary coolant 40 within reactor vessel 70 remains at a pressure above atmospheric pressure, thus allowing the coolant to maintain a high temperature without vaporizing or boiling.

A secondary coolant (not shown) within heat exchangers 50 and 60 is heated, via the thermal energy provided to heat exchangers 50 and 60 from primary coolant 40. The heated secondary coolant within heat exchangers 50 and 60 may begin to boil or vaporize. The steam generated by boiling the secondary coolant may be used to drive one or more turbines that convert the thermal energy of the steam into electrical energy. After condensing, the secondary coolant returns to locations near the base of heat exchangers 50 and 60.

Various embodiments of core support assembly 25 provide axial (or vertical) support to the fuel assemblies in the core 20. The axial support may be provided at the top, the bottom, or at both ends of the fuel assemblies. The core support assembly 25 vertically restrains the fuel assemblies in the core 20 through upper and lower support plates that are mounted adjacent top and bottom ends, respectively of the core support assembly 25. Lateral restraint of the fuel assemblies may be accomplished with a solid or semi-solid wall of the core support assembly 25 that surrounds the core 20. The core support assembly 25 generally restrains the fuel assemblies in the core 20 during both normal operation as well as during an emergency event, such as a seismic event.

In the embodiment shown in FIG. 1, a downcomer region between the reflector 15 and the reactor vessel 70 may provide a fluid path for the primary coolant 40. Due to at least convection, the heated primary coolant 40 at the top of the vessel 70 may flow downward in an annulus between the riser and the reactor vessel 70 towards a bottom end of the vessel 70. The fluid path channels primary coolant 40 that has yet to be recirculated through the core 20 into convective contact with at least one surface of the reflector 15 in order to cool the reflector 15.

Either singly or in combination, the reflector 15 or core support assembly 25 may provide structural support and stability of the vertical orientation of the fuel assemblies, control rod assemblies, and in-core instrumentation. Further, one or more of reflector 15 or core support assembly 25 may include a mean time to failure (MTTF) of at least 60 years, when submerged in the primary coolant 40 and proximate or adjacent to the operating core. Accordingly, at least one of the reflector 15 or core support assembly 25 may be radiation resistant and/or radiation tolerant.

Furthermore, at least one of the reflector 15 or core support assembly 25 may be configured and arranged to form a closed natural circulation circuit while minimizing flow resistance in the nuclear reactor system 100 that is operating under passive convective circulation, as shown in at least FIG. 1. In some embodiments, the heat transfer of the primary coolant 40 is the primary driver of passive convective circulation. In at least one embodiment, passive convective circulation is not assisted by one or pumps within nuclear reactor system 100. At least one of the reflector 15 or core support assembly 25 may at least partially backscatter neutrons generated in core 20 back towards core 20, as well as providing neutron and/or gamma-ray shielding for the reactor vessel 70 and the containment vessel 10.

Figure 2A:
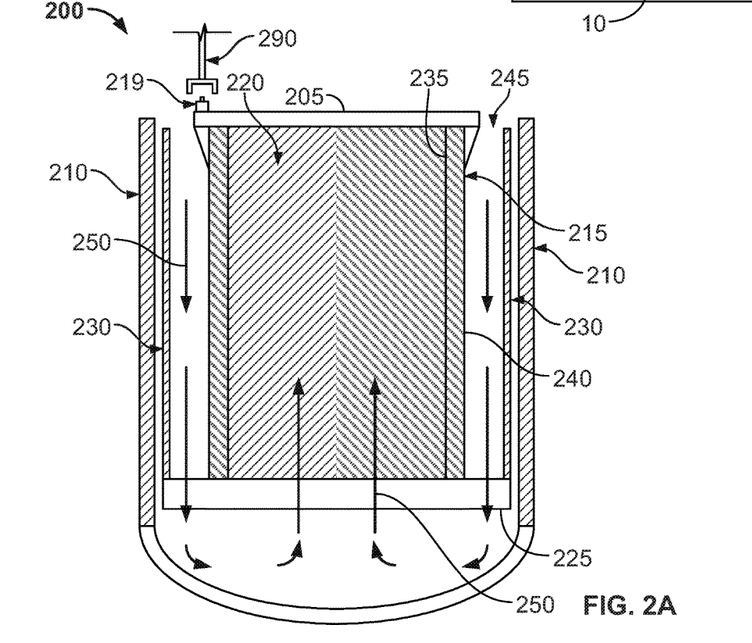
FIG. 2A is schematic diagram showing a side view of a circulation path in a portion of a nuclear reactor system.
Figure 2B:
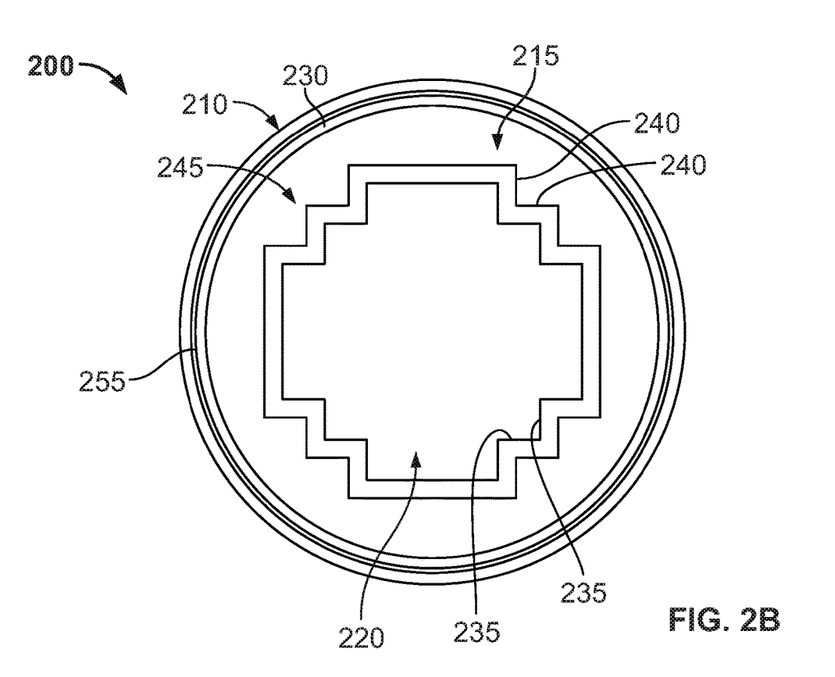
FIG. 2B is schematic diagram showing a top view of the circulation path in the portion of the nuclear reactor system of FIG. 2A.

FIG. 2A is schematic diagram showing a side view of a circulation path in a portion of a nuclear reactor system 200. FIG. 2B is schematic diagram showing a top view of the circulation path in the portion of a nuclear reactor system 200 of FIG. 2A. Nuclear reactor system 200 of FIGS. 2A-2B may include similar features to nuclear reactor system 100 of FIG. 1. For instance, the portion of nuclear reactor system 200 shown in FIGS. 2A-2B, may be included in nuclear reactor system 100 of FIG. 1, or be included in another nuclear reactor system. Similar to nuclear reactor system 100, nuclear reactor system 200 may employ passive convective circulation of at least the primary coolant 250.

Various embodiments of nuclear reactor system 200 include a latch assembly 219. Latch assembly 219 may be remotely operated via a remotely actuated tooling 290. Nuclear reactor system 200 includes a flow of primary coolant 250 that is passively convectively circulated generally downward from a top end of a reactor vessel 210 toward a bottom end of reactor vessel 210. Such a convective flow of primary coolant 250 is discussed in conjunction with at least nuclear reactor system 100 of FIG. 1. A generally downward flow of primary coolant 250 may enable cooling of reflector 215. Reflector 215 may be positioned adjacent and/or around nuclear core 220. Similar to nuclear core 20 of FIG. 1, nuclear core 220 of nuclear reactor system 200 houses nuclear fuel assemblies.

Nuclear reactor system 200 includes a core support assembly, such as but not limited to core support assembly 25 of FIG. 1. The core support assembly includes an upper support plate 205. Upper support plate 205 may be positioned above the top end of nuclear core 220 and a riser, such as but not limited to the riser of FIG. 1. Various embodiments of core support assemblies may include a lower support plate 225 that is positioned below the nuclear core 220. For instance, lower support plate 225 may be positioned below a bottom end of nuclear core 220. Lower support plate 225 may be sized to extend around a perimeter of an inside surface of the reactor vessel 210. Reactor vessel 210 may include similar features to reactor vessel 70 of FIG. 1.

The core support assembly may include a core barrel 230 positioned adjacent the inside surface of the reactor vessel 210. The configuration of the core barrel 230 and reactor vessel 210 defines a relatively small annulus (shown as outer annulus 255 in FIG. 2B) intermediate the core barrel 230 and inside surface of the reactor vessel 210. Either singly, or in combination, the upper support plate 205, the lower support plate 225, and the core barrel 230 provide at least one of axial and/or lateral support to the core 220. The support may be provided during normal operation of nuclear reactor system 200, as well as during an emergency event, such as a seismic event.

One or more of upper and/or lower support plates 205/225 may include a plurality of at least one of holes, channels, or apertures to enable fluid communication through the upper and/or lower supper 205/225. In an exemplary embodiment, a plurality of apertures in each of upper and lower support plates 205/225 enables the flow of primary coolant 250 through the support plates. As illustrated in FIG. 2A, primary coolant 250 is convectively circulated downward within an annulus (shown as inner annulus 245 in FIG. 2B) intermediate the reflector 215 and the core barrel 230. At least partially due to a convex bottom portion of the reactor vessel 210, the primary coolant 250, is redirected towards a center of the vessel 210 and upward through the nuclear core 220. As the primary coolant 250 circulates upward through the core 220, heat is transferred to the primary coolant 250, via thermal energy generated from the ongoing fission reactions within nuclear core 220. As discussed above, at least a portion of the heat provided to the primary coolant 250 is then transferred to a secondary coolant that is circulated in heat exchangers, such as but not limited heat exchangers 50 and 60 of nuclear reactor system 100. Although not shown in FIGS. 2A-2B, such heat exchangers may be mounted adjacent a riser of the nuclear reactor system 200, as discussed in conjunction with FIG. 1.

In various embodiments, reflector 215 surrounds core 220 and backscatters neutrons that leak from nuclear core 220. Such backscattering reflects the neutrons back into the nuclear core 220. At least partially due to these nuclear interactions with neutrons liberated within nuclear core 220, reflector 215 may be heated. Thus, reflector 215 may require cooling. An inner face 235 of the reflector 215 is at least partially cooled by the generally upward flow of primary coolant 250 through the nuclear core 220. An outer face 240 of the reflector 215 is at least partially cooled by the generally downward flow of the primary coolant 250 within inner annulus 245 that is intermediate the reflector 215 and the core barrel 230.

As shown in FIG. 2A, the entirety of or at least a substantial portion of the primary coolant flow 250 is circulated through the nuclear core 220, and without bypassing the nuclear core 220, to flow through the reflector 215. Thus, the generally downward flow within inner annulus 245 and generally upward flow within nuclear core 220 of primary coolant 250 may provide all or at least a substantial portion of the cooling of the reflector 215. As noted above, the generally downward flow of primary coolant 250 cools the outer face 240 of reflector 215. The generally downward flow of primary coolant 250 cools the inner face 235 of reflector 215.

In various embodiments, one or more latch assemblies 219 are employed to couple the upper support plate 205 to the core barrel 230 and/or core 220. Although only a single latch assembly 219 is shown in FIG. 2A, other embodiments are not so constrained and may employ multiple latch assemblies to couple the upper support plat 205 to core barrel 230. In at least one embodiment, two latch assemblies are employed, while in other embodiments, 4, 6, or 8 latch assemblies are employed. In some embodiments, these upper latch assemblies are positioned around the upper support plate 205 to couple upper support plate 205 to the core barrel 230. Accordingly, latch assembly 219 may be a coupler. In some embodiments, latch assembly 219 is a fastener.

Although not shown in exemplary, but non-limiting, embodiment nuclear reactor system 200, one or more latch assemblies, such as but not limited to latch assembly 219, are employed to couple lower plate 225 to the core barrel 230. For instance, one or more lower latch assemblies may be positioned around the lower support plate 225 to couple lower support plate 225 to nuclear core 220. Similar to the upper latch assemblies, the number of lower latch assemblies employed may be varied. As noted above, each of the one or more upper and lower latch assemblies may be remotely operated via a remotely actuated tool, such as but not limited to remotely actuated tooling 290.

The operation of a latch assembly may include locking and/or unlocking the latch assembly. For instance, when latch assembly 219 is in an unlocked state, upper support plate 205 is decoupled from core barrel 230 and/or nuclear core 220. Similarly, when latch assembly 219 is in a locked state, upper support plate 205 is coupled to core barrel 230. As discussed in conjunction with FIGS. 3A-3F, the one or more latch assemblies may be operated via a rotational motion, such as but not limited to a rotation of a portion of the latch assembly less than 360 degrees. In an exemplary embodiment, latch assembly 219 may be transitioned from an unlocked state to a locked state via a rotation that is less than a full rotation of the rotating portion of latch assembly 219. In other embodiments, one or more full rotations may be required to transition latch assembly 219 from an unlocked state to a locked state. In such embodiments, the rotating portion of latch assembly 219 may include at least a threaded fastener.

At least a portion of actuated tooling 290 may be positioned within the reactor pool from above the waterline 90 of FIG. 1. The actuated tooling 290 may be positioned within the containment vessel 10 and reactor vessel 70 of FIG. 1. In such embodiments, the actuated tooling 290 is employed to operate latch assembly 219, including but not limited to transition latch assembly 219 between locked and unlocked states. In various embodiments, actuated tooling 290 is configured and arranged to engage latch assembly 219 without disassembly of other portions of nuclear reactor system 200. In some embodiments, actuated tooling 290 is configured and arranged to engage latch assembly 219 with only minimal disassembly of other portions of nuclear reactor system 200. Accordingly, latch assembly 219 may be actuated via actuated tooling 290 without draining the reactor pool or a primary coolant enclosed in the reactor vessel 70 of FIG. 1.

Figure 3A:
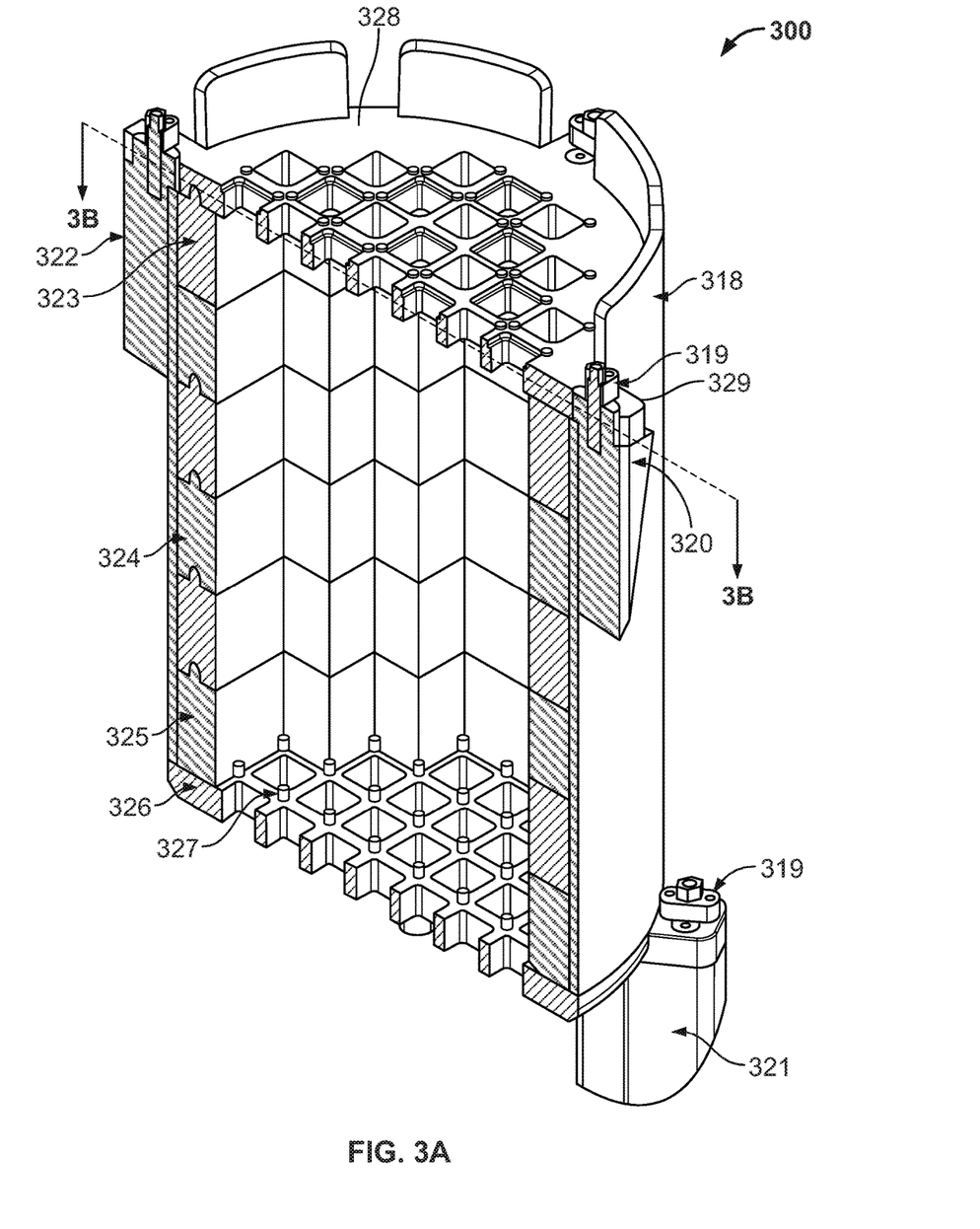
FIG. 3A illustrates an off-axis view of a longitudinal cross-section of another embodiment of a nuclear reactor system that includes a plurality of latch assemblies and is consistent with the various embodiments.
Figure 3B:
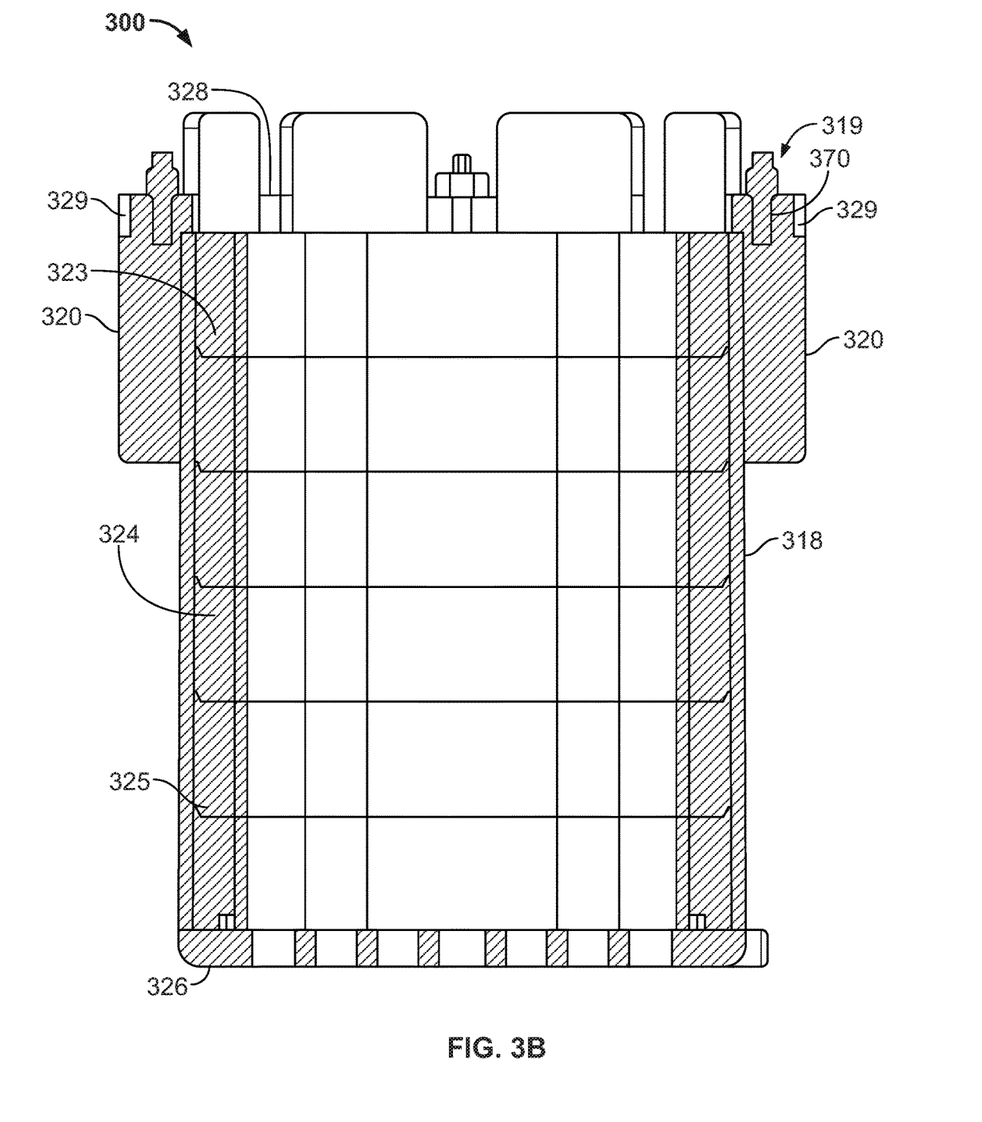
FIG. 3B illustrates a section view of the longitudinal cross-section of the nuclear reactor system of FIG. 3A.
Figure 3C:
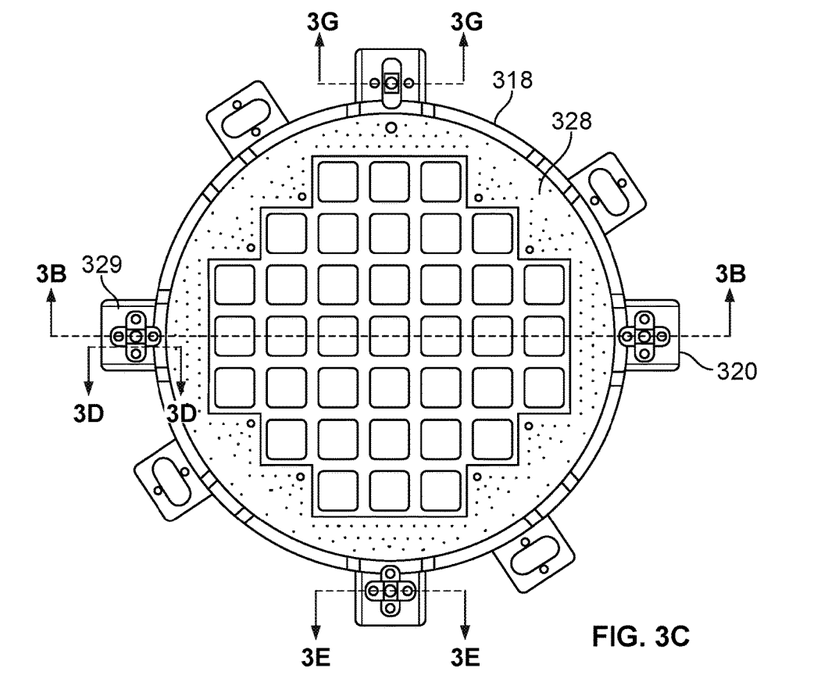
FIG. 3C illustrates a top view of the nuclear reactor system of FIGS. 3A-3B.

FIG. 3A illustrates an off-axis view of a longitudinal cross-section of another embodiment of a nuclear reactor system 300 that includes a plurality of latch assemblies 319 and is consistent with the various embodiments. FIG. 3B illustrates a side view of the longitudinal cross-section of the nuclear reactor system 300 of FIG. 3A. FIG. 3C illustrates a top view of the nuclear reactor system 300 of FIGS. 3A-3B. Nuclear reactor system 300 may include similar features to at least one of nuclear reactor system 100 of FIG. 1 or nuclear reactor system 200 of FIGS. 2A-2B.

Nuclear reactor system 300 includes at least one of a core barrel 318, reflector blocks 323-325, a lower support plate 326, or an upper support plate 328. In some embodiments, lower support plate 326 may include a lower core plate. Nuclear reactor system 300 includes a plurality of upper latch assemblies 319 and a plurality of lower latch assemblies 319. The upper latch assemblies 319 selectively couple and lock the upper support plate 328 to the core barrel 318. Similarly, the lower latch assemblies selectively couple and lock the lower support plate 326 to the core barrel 318.

Although not shown in FIGS. 3A-3C, similar to at least nuclear reactor system 100 and nuclear reactor system 200, nuclear reactor system 300 includes a reactor vessel, such as but not limited to nuclear reactor vessel 70 of FIG. 1 or reactor vessel 210 of FIG. 2. The nuclear reactor vessel may house one or more of the core barrel 318, reflector blocks 323-325, a lower support plate 326, or an upper support plate 328. Nuclear reactor system 300 may include a reflector, such as but not limited to reflector 15 and/or reflector 215 of nuclear reactor systems 100 and/or 200 respectively. The reflector may include reflector blocks 323-325. The lower support plate 326 may include a plurality of lower support posts 327. In at least one embodiment lower support posts 327 may be shared fuel pins. Some embodiments may include upper support posts one the upper support plate 328 that are analogous to the lower support posts 327 of the lower support plate 326. In some embodiments, core barrel 318 at least partially supports upper support plate 328. One or more reflector blocks 323-325 may provide at least partial longitudinal and/or lateral support for upper support plate 328 and/or lower support plate 326.

In various embodiments, upper support plate 328 is coupled to a plurality of upper support blocks 320 via one or more upper latch assemblies 319. In the exemplary embodiment shown in FIGS. 3A-3C, the upper support plate 328 selectively couples and locks onto the upper support blocks 320 (and thus the core barrel 318) via the one or more upper latch assemblies 319. The upper support blocks 320 may be permanently coupled to the core barrel 318 via welds, bolts, or other coupling techniques. Accordingly, the upper support plate 328 is coupled to the core barrel 318 via the upper support blocks 320. The upper support plate 328 may include one or more flanges, such as but not limited to flange 329. Flange 329 extends over a top surface of the upper support block 320. When upper latch assembly 319 couples flange 329 to the upper support block 320, the upper core plate 328 is secured to the upper support block 320 and core barrel 318.

In an exemplary, but non-limiting embodiment, nuclear reactor system 300 includes one or more lower core support blocks 321. In some embodiments, lower core support blocks 321 may include one or more core support blocks. The lower support plate 326 is selectively coupled and locked to the lower core support blocks 321 (and thus the reactor vessel) via one or more lower latch assemblies 319. The lower core support block 321 may be permanently coupled, via welds or other coupling techniques, to a lower portion of the reactor vessel that houses a nuclear core of nuclear reactor system 300, such as the configuration shown in at least FIG. 1. The lower core support blocks 321 transfer lateral and compressive loads from the lower core plate 326 to the reactor vessel. Although only one lower support block 321 is shown in FIG. 3A, other embodiments are not so constrained, and may include a plurality of lower support blocks. For instance, a nuclear reactor system may include a plurality of lower support blocks coupled to the lower support plate 326 through a plurality of lower latch assemblies 319.

Each of the upper and lower support plates 328 and 326 may include a plurality of flanges that extend in a general radial direction beyond a perimeter of upper or lower support plates 328/326. As discussed herein, the term radial direction may refer to a direction that is generally parallel to the direction of a local radius of curvature of a curved surface. In some embodiments, flange 329 may extend laterally away from the perimeter of the upper support plate 328. As shown in the top view of FIG. 3C, when the upper support plate 328 above the core barrel 318, the flanges 329 of the upper support plate 328 extend in a general radial direction beyond a perimeter of core barrel 318. Although FIG. 3C shows four flanges 329 coupled to four upper support blocks 320 of core barrel 318, via four upper latch assemblies 319, other embodiments are not so constrained. For instance, more than or less than four flanges may extend radially from the upper support plate 328. In various embodiments, the number of flanges is equivalent to the number of coupling locations for coupling the upper support plate 328 to the core barrel 318. The number of coupling locations may be based on at least one of the expected static and/or dynamic operating loads on the nuclear reactor system 300, as well as the expected (and unexpected) catastrophic loads, such as seismic loads due to a seismic event.

Figure 3D:
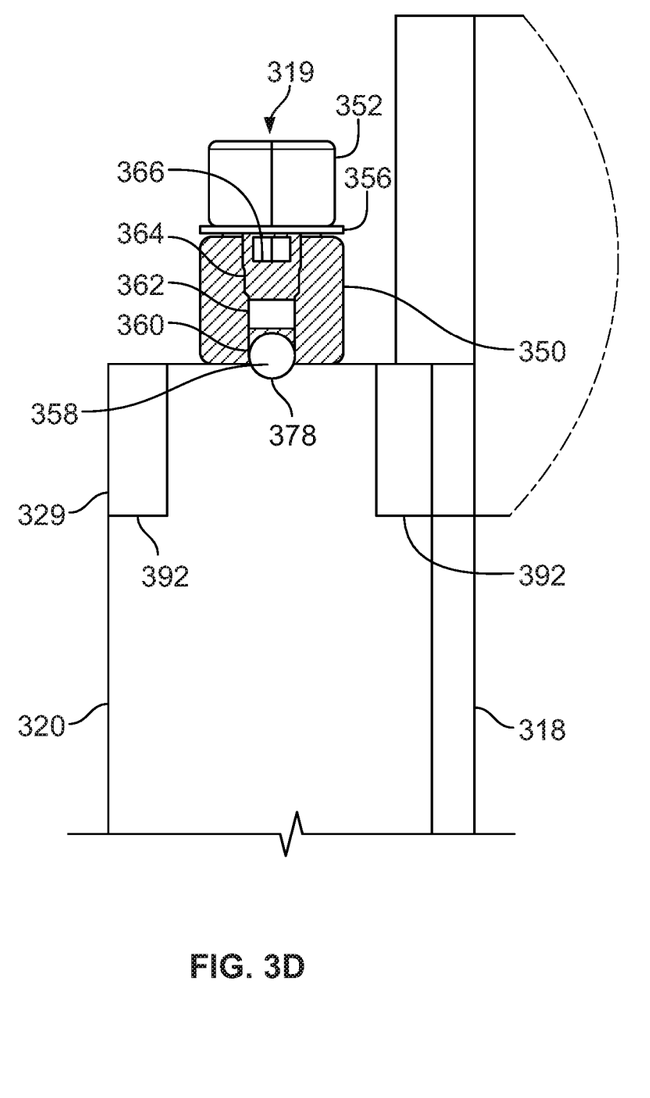
FIG. 3D shows a section view of a latch assembly coupling and locking a flange of an upper or lower support plate to a corresponding upper or lower support block.
Figure 3E:
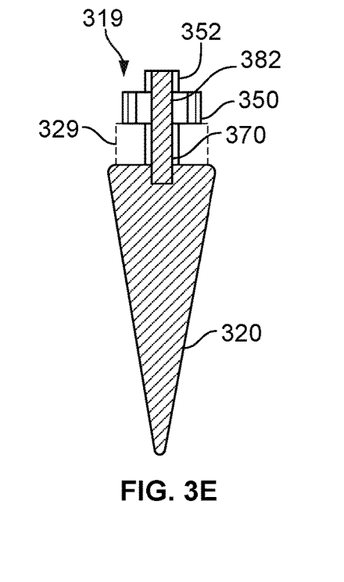
FIG. 3E illustrates a section view of the latch assembly and the support block of FIG. 3D.
Figure 3F:
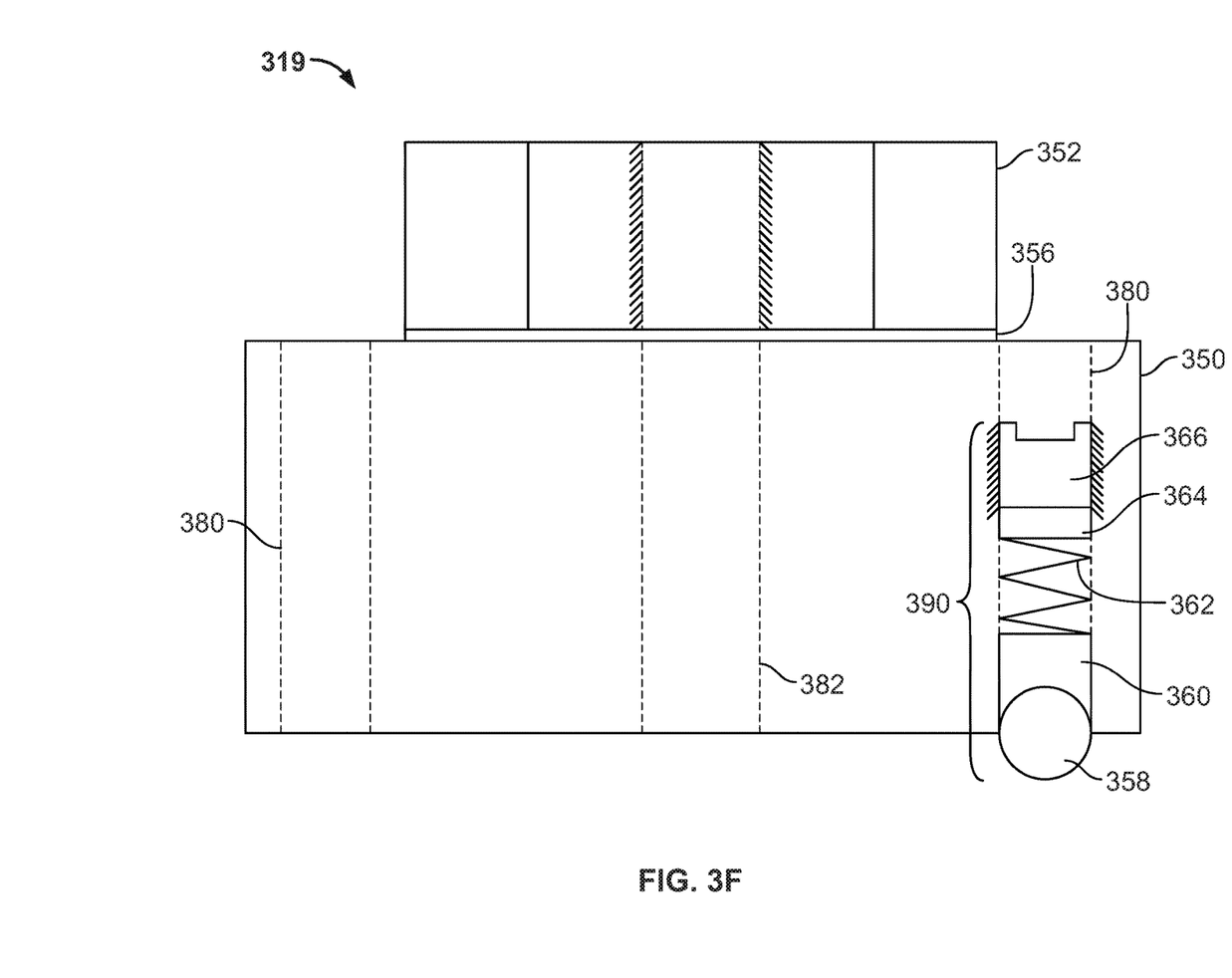
FIG. 3F illustrates a close-up side view of the latch assembly of FIGS. 3D and 3E.

FIGS. 3D-3F illustrate various embodiments and views of latch assembly 319 coupling a flange 329 of a support plate to a support block 320 of a core barrel. The latch assemblies 319 shown in FIGS. 3D-3F may include similar features to any of the latch assemblies described herein, including but not limited to latch assembly 219 of FIG. 2A or upper and lower latch assemblies 319 of FIGS. 3A-3C. FIG. 3D shows a side view of latch assembly 319 coupling and locking flange 329 of an upper or lower support plate to a corresponding upper or lower support block 320. FIG. 3E illustrates a side view of the latch assembly 319 and support block 320 of FIG. 3D. FIG. 3F illustrates a close-up side view of the latch assembly 319 of FIGS. 3D and 3E. Latch assembly 319 of FIGS. 3C-3F may be included in any of nuclear reactor systems 100, 200, or 300 of FIGS. 1, 2A-2B, and 3A-3C respectively. Latch assembly 319 of FIGS. 3D-3F may be an upper or a lower latch assembly, as described herein. Accordingly, support block 320 of FIGS. 3D-3F may be lower or upper support blocks, such as but not limited to lower support blocks 321 or upper support blocks 320 of FIG. 3A. Flange 329 may be included in an upper or a lower support plate, such as but not limited to upper support plate 328 or lower support plate 326 of FIG. 3A.

As shown in the combination of FIGS. 3D-3F, latch assembly 319 includes a latch housing 350, a cylindrical member (such as but not limited to bolt 370), a washer 356, and a nut 352. FIG. 3F shows main bore 382, or borehole, extending through the latch housing 350 at or near a center of the latch housing 350. Thus, main bore 382 may be a central bore. The main bore 382 of latch housing 350 may align with the central bores of the washer 356 and the nut 352. In some embodiments, washer 356 may be at least one of a Belleville washer, coned-disc spring, conical spring washer, disc spring, or a cupped spring washer. The cylindrical member or bolt 370 may be an elongate member. Bolt 370 may include a longitudinal axis. When the main bore 382 of latch housing 350 receives bolt 370, the latch housing 350 is rotatable about the longitudinal axis of bolt 370. Accordingly, the central axis of main bore 382 may be coincident with the longitudinal axis of bolt 370 and the rotational axis of latch housing 350.

As shown in at least FIG. 3E, the main bore 382 of latch housing 350 and the central bores of the washer 356 and the nut 352 are sized to receive a bolt 370. Bolt 370 is coupled to the support block 320 and extends upward from a top surface of the support block 320. Bolt 370 may be coupled to support block 320 via threads, welds, or other such coupling techniques. Bolt 370 may be permanently coupled to support block 320. In at least one embodiment, once coupled to support block 370, bolt 370 does not rotate relative to support block 320. In other embodiments, bolt 370 does rotate relative to support block 320. Latch housing 350, washer 356, and nut 352 may be positioned over the bolt 370. Nut 352 may be coupled to the bolt 370, via a plurality of threads. When nut 352 is coupled to bolt 370, the position of latch housing 350 is secured onto the top surface of the support block 320.

As shown in FIG. 3F, latch housing 350 includes two side bores 380. Each of the side bores 380 extends generally vertically intermediate a bottom surface of the latch housing 350 and a top surface of the latch housing 350. In other embodiments, latch housing 350 may include less than or more than two side bores. The axis of side bore 380 may be parallel to, but offset from, the central (and rotational) axis of latch housing 350. A latch mechanism 390 is positioned within one of the side bores 380. The latch mechanism 390 includes at least one of spheroidal member 358, a curved disk 360, a biasing member 362, a flat disk 364, and a setscrew 366. The spheroidal member 358 may be a ball bearing. As shown in at least FIG. 3F, because at least a portion of spheroidal member 358 projects from the lower surface of latch housing 350, spheroidal member 358 may be a projection member. The biasing member 362 may be a spring or an elastomer member. In at least one embodiment, biasing member 362 may be a helical coil spring. FIG. 3F shows that only one of the two side bores 380 includes a latch mechanism 390. However, other embodiments are no so limited, and a similar latch mechanism, as described herein, may be included in each of the side bores 380.

As described in the context of at least FIGS. 3D and 3E, the latch mechanism 390 may be actuated to couple and lock a flange 329 of an (upper or lower) support plate to the latch assembly 319. In the non-limiting embodiment of an upper support plate, when actuated, the latch mechanism 390 couples and locks the flange 329 (as shown in at least FIGS. 3D-3E) of the upper support plate 328 (as shown in at least FIGS. 3A-3B) to the support block 320. As described above, when flange 329 is coupled to the upper support plate 328, upper support plate 328 is coupled and locked to the core barrel 318.

To place the one or more latch assemblies 319 in position, the nuclear reactor system 300 may be assembled within a reactor pressure vessel. The reflector blocks 323-325 are supported on the lower support plate 326. From above, the core barrel 318 may be positioned to surround the reflector blocks 323-325, with the upper support blocks 320 permanently coupled, via one or more welds, to the core barrel 318. As shown in at least FIGS. 3B and 3E, at least a portion of upper support block 320 includes a bolt 370 or elongate member. Bolt 370 extends from a top surface of the upper support block 320 and is coupled to upper support block 320 via one or more of welds, threads, or other suitable coupling mechanisms. The upper support plate 328 is positioned on top of the reflector blocks 323 so that the flanges 329 also rest upon shoulder surfaces 392 (of FIG. 3D) of the support block 320. As shown in FIG. 3E, the flanges 329 include holes, apertures, or bores to allow a top portion of the support block 320, including at least the bolt 370, to extend upwardly through.

To place the latch assembly 319 into position on the support block 320 and the flange 329, as shown in FIG. 3D, the latch housing 350 may be positioned over the bolt 370. Bolt 370 is received via main bore 382 of latch housing 350 (as shown in FIG. 3E). The washer 356 and the nut 352 may then be positioned over the latch housing 350, with the nut 352 secured to the bolt 370. Transitioning the latch assembly 319 between a locked and an unlocked state (or position) may include rotating (about a longitudinal axis of bolt 370 or the central or rotational axis of latch housing 350) the latch housing 350 through an angle substantially equivalent to 90 degrees. Note that the longitudinal axis of bolt 370 is aligned with the axis of the main bore 382 of latch housing 350.

Flange 329 includes an aperture. The aperture includes an asymmetric shape. As shown in FIG. 3C, the asymmetric shape of a flange's 329 aperture may be that of an elongated oval. Note that the longitudinal axis of the asymmetric shape of flange 329 is substantially tangential to the perimeter of the support plate 328. The flange's asymmetric shape of FIG. 3C is a non-limiting exemplary embodiment, and other embodiments may include other asymmetric shapes with other orientations. The latch housing also includes an asymmetric shape. In some embodiments, the asymmetric shape of the flange is substantially equivalent to the asymmetric shape of the latch housing. In some rotational orientations, the latch housing may be receivable by the aperture, while in other rotational orientations, the latch housing is not receivable by the aperture. When rotated to not be receivable by the aperture (locked state), the latch housing may restrain a displacement of the support plate. When rotated to be receivable by the aperture (unlocked state), the latch housing does not restrain a displacement of the support plate.

The asymmetric shape of the latch housing may be aligned with the asymmetric shape of the aperture of the flange. Similarly, by virtue of a rotation of the latch housing about axis aligned with the central bore of the latch housing, the asymmetric shape of the latch housing may be anti-aligned with the asymmetric shape of the aperture of the flange.

As show in FIG. 3C, when the latch housing is rotated such that the asymmetric shape of the latch housing is aligned with the asymmetric shape of the aperture of the flange, the latch housing is receivable by the aperture. Accordingly, support plate 328 may be lifted upward and off the support blocks 320. Thus, when the asymmetric shape of the latch housing is aligned with the asymmetric shape of the aperture of the flange, the latch assembly is in the unlocked state or position.

In contrast, when the latch housing is rotated such that the asymmetric shape of the latch housing is anti-aligned with the asymmetric shape of the aperture of the flange, the latch housing is not receivable by the aperture. The anti-alignment of the asymmetric shape of the latch housing and the asymmetric shape of the aperture of the flange restrains a vertical displacement of the support plate. Thus, when the asymmetric shape of the latch housing is anti-aligned with the asymmetric shape of the aperture of the flange, the latch assembly is in the unlocked state or position.

As shown in FIG. 3C, the non-limiting exemplary asymmetric shape of the latch housing (and the aperture of the flange) is that of an elongated oval. The asymmetry of the shape defines a longitudinal axis that is generally in the direction of the elongation. The longitudinal axis of the latch housing is substantially perpendicular to the axis of the central bore 382, which is also the axis of rotation of the latch housing.

As generally shown in FIG. 3C, a latch assembly 319 may be in the locked state when the latch housing 350 is rotated such that a longitudinal axis of the latch housing 350 (that is substantially perpendicular to the longitudinal axis of bolt 370) is substantially radial, with respect to a center of upper plate 328. Thus, when the latch housing 350 is rotated such that a lengthwise dimension (along the longitudinal axis) of the latch housing 350 is substantially parallel with an adjacent side of the core barrel 318, the latch housing 350 may be in a locked position.

Figure 3G:
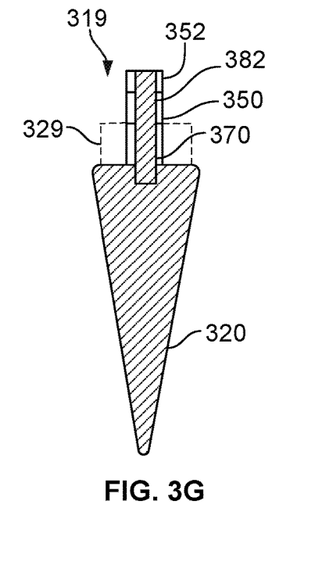
FIG. 3G illustrates another close-up side view of the latch assembly of FIGS. 3D and 3E.

The latch housing 350 may be transitioned to an unlocked position by rotating the latch housing 350 (about the longitudinal axis of bolt 370) approximately 90 degrees (or some other rotation that is less than 360 degrees), as shown in FIGS. 3C and 3G. Thus, a latch assembly 319 may be in the unlocked state when the latch housing 350 is rotated such that a longitudinal axis of the latch housing 350 is substantially orthogonal to a tangent of a portion of the perimeter of upper plate 328 that corresponds to latch housing 350, as shown in FIG. 3G.

As shown in FIG. 3E, when the latch housing 319 is in a locked position, a portion of the spheroidal member 358 is positioned within an indent 378 on the top surface of the flange 329. FIG. 3C shows an embodiment of flange 329, where flange 329 includes two indents. Each indent in flange 329 is disposed on one of the elongated sides of the asymmetrical shape of the aperture in flange 329. Although not shown in FIG. 3E, a second spheroidal member may also be positioned within a second indent on the top surface of the flange 329. As discussed further below, when the latch housing is rotated to the locked position, each of the indents receives at least a portion of one of the spheroidal members 358 included in latch housing.

As shown in the combination of FIGS. 3E and 3F, the spheroidal member 358 may be urged downward by the biasing member 362. When the latch housing 350 is rotated such that spheroidal member 358 is aligned with indent 378 of flange 329, such as that shown in FIG. 3D, biasing member 362 urges spheroidal member 358 into indent 378 of flange 329.

In these exemplary, but non-limiting embodiments, the flat disk 364 is positioned adjacent to and above biasing member 362, while curved disk 360 is positioned adjacent to a below biasing member 362. The lower curved surface of curved disk 360 may include an indent that is sized to receive a portion of spherical member 359. The flat lower surface of flat disk 364 and the flat upper surface of the curved disk 360 ensure stable surfaces from which the biasing member 362 may urge the spheroidal member 358 into the indent 378 of flange 329. The indent included in the lower curved surface of curved disk 360 may be a hemispherical indent that receives spheroidal member 358. When the hemispherical indent mates with spheroidal member 358, the force exerted by the biasing member 362 is substantially transferred to the spheroidal member 358.

As shown in FIG. 3F, setscrew 366 may be employed to adjust the force exerted by the biasing member 362 to the spheroidal member 358. Such an adjustment includes adjusting a pre-load on the biasing member 362 via setscrew 366. Setscrew 366 is engaged with internal threads of the side bore 380 to enclose the disks 360/364. By adjusting the pre-load on biasing member 362 via setscrew 366, the amount of force applied to the spheroidal member 358 by the biasing member 362 is adjusted. The torque required to transition latch housing 350 between the locked position and the unlocked position may be adjusting by adjusting the force exerted by biasing member 362 to the spheroidal member 358, via an adjustment to setscrew 366.

Once the latch housing 350 is positioned on top of flange 329, bolt 370 received by main bore 382, the latch assembly 319 may be transitioned between a locked and unlocked state via the rotation of latch housing 350. As shown in FIGS. 3D-3E, when the latch housing 350 is rotated such that latch assembly 319 is in a locked state, flange 329 is locked, via latch assembly 319, on top of the support block 320. In the locked position, the spheroidal member(s) 358 may be received by and mated with respective indents 378 of the top surface the flange 329. Furthermore, when in the locked position, the latch housing 350 may extend across top surfaces of the support block 320 and the flange 329 and restrain an upward displacement of the support plate.

The latch assembly 319 may be adjusted from the locked state to the unlocked state (as shown in FIGS. 3C and 3G) by rotating the latch housing 350 a quarter turn, or approximately 90 degrees. In other embodiments, the transition may be accomplished by a turn of another angular value that is less than 360 degrees. As shown in FIG. 3C, such a rotation aligns the latch housing 350 with a hole, aperture, or bore through the flange 329. When the latch housing 350 is aligned with the aperture of flange 329, the flange 329 may be lifted over the latch assembly 319.

In various embodiments, when the spheroidal members 358 are received by the corresponding indents 378 of flange 329, the urging, via biasing member 362, of spheroidal member 358 into indent 378 may provide resistance to turning the latch housing 350. Such a resistive force requires a minimum torque on the latch housing 350 to displace the members 358 from the indents 378. Once displaced, the latch housing 350 may be rotated. As described above, this minimum torque may be adjusted via setscrew 366.

The latch assembly 319 may be adjusted from the unlocked position to the locked position by rotating the latch housing 350 (either clockwise or counter-clockwise) a quarter turn, or approximately 90 degrees. In various embodiments, washer 356 may decouple the rotation of latch housing 350 from the nut 352, so that rotation of the latch housing 350 does not rotate the nut 352, or rotates the nut 352 a negligible amount. This feature ensures that nut 352 does not rotate, with respect to bolt 370, such that nut 352 does not decouple from bolt 370 when latch housing is rotated about bolt 370 and transitioned between locked and unlocked positions.

As compared to conventional fasteners, such as threaded fasteners, the various embodiments of latch assemblies described herein provide a clear and visual indication of when the latch assembly is in a locked state or in an unlocked stated, via the rotational position of the latch housing. For instance, threaded fasteners may loosen over time due to radiation-induced embrittlement, repeated use, or otherwise, without visually appearing loosened to an observer. Thus, an observer may not determine that a conventional fastener that couples one or more components of a core assembly has loosened over time. In contrast, the state (locked or unlocked) of the latch assembly 319 may be visually determined based at least in part on a rotational position or orientation of the latch housing 350 relative to the core barrel 318 or the aperture of a support plate.

Furthermore, the latch assembly 319 may be transitioned between the locked and unlocked states remotely. For instance, a tool that extends from a location external to a reactor pressure vessel, a containment vessel, and even a reactor pool, may be employed to rotate latch housing 90 degrees. For example, as shown in FIG. 2A, remotely actuated tooling 290 may be positioned from above the waterline 90 of the reactor pool and extended to manipulate (e.g., lock or unlock) a latch assembly (via a quarter-turn rotation of the corresponding latch housing) that connects particular components of a core assembly. In contrast, a traditional threaded connector may require manipulation by a person within the reactor vessel. Enabling access to the reactor vessel would cause a costly shutdown and disassembly of portions of the nuclear reactor power module, as well as potential exposure to radiation via the reactor core.

All or some of the components of the latch assembly 319 may be made from a corrosion resistant material, such as stainless steel or otherwise. Further, all or some of the components of the latch assembly 319 may be made from a material that resists embrittlement due to radioactive energy deposition or radioactive particle interaction.

While the preferred embodiments of the invention have been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A nuclear reactor system, comprising:
   a support plate that includes a flange that extends beyond a perimeter of the support plate, wherein the flange includes an aperture with a longitudinal aperture axis; and
   a latch assembly that includes a latch housing with a longitudinal latch axis and is disposed above the flange, wherein the latch housing is configured and arranged for at least a first and a second rotational orientation; and a core barrel that includes a support block that extends beyond a perimeter of the core barrel, wherein the flange of the support plate is disposed vertically intermediate the support block and the latch housing, and the support block is configured to restrain a downward displacement of the support plate such that when the latch housing is in the first rotational orientation, the support plate is locked to the core barrel, wherein when the latch housing is in the first rotational orientation, the longitudinal latch axis is substantially aligned with the longitudinal aperture axis of the flange and the latch housing is receivable through the aperture of the flange such that the latch housing does not restrain an upward displacement of the support plate, and when the latch housing is in the second rotational orientation, the longitudinal latch axis is substantially transverse to the longitudinal aperture axis and the latch housing is not receivable through the flange such that the latch housing restrains the upward displacement of the support plate.

2. The nuclear reactor system of claim 1, wherein the latch assembly further includes an elongate member that extends through the flange and a main bore of the latch housing, wherein the latch housing is configured and arranged to rotate about the elongate member between the first and the second rotational orientations.

3. The nuclear reactor system of claim 1, wherein a relative angular difference between the first and the second rotational orientations of the latch housing is 90 degrees.

4. The nuclear reactor system of claim 1, wherein an upper surface of the flange includes an indent, and when the latch housing is in the second rotational orientation, the indent receives at least a portion of the latch housing that projects from a lower surface of the latch housing, and when received by the indent, the portion of the latch housing that projects from the lower surface of the latch housing is configured to resist a rotation of the latch housing away from the second rotational orientation.

5. The nuclear reactor system of claim 1 further comprising:
a latch mechanism that is at least partially housed within the latch housing and includes at least a spheroidal member, a biasing member that provides a biasing force on the spheroidal member, and a setscrew to adjust a magnitude of the biasing force.

6. The nuclear reactor system of claim 1 further comprising:
a nut disposed above the latch housing that restrains an upward displacement of the latch housing.

7. The nuclear reactor system of claim 4, wherein the portion of the latch housing that projects from the lower surface of the latch housing comprises a spheroidal member.

8. The nuclear reactor system of claim 2, wherein a relative angular difference between the first and the second rotational orientations of the latch housing is 90 degrees.

9. The nuclear reactor system of claim 8, wherein an upper surface of the flange includes an indent, and when the latch housing is in the second rotational orientation, the indent receives at least a portion of the latch housing that projects from a lower surface of the latch housing, and when received by the indent, the portion of the latch housing that projects from the lower surface of the latch housing is configured to resist a rotation of the latch housing away from the second rotational orientation.

10. The nuclear reactor system of claim 9, further comprising a nut disposed above the latch housing that restrains an upward displacement of the latch housing.

11. A nuclear reactor system, comprising:
a support plate that includes a flange that extends beyond a perimeter of the support plate, wherein the flange includes an aperture with a longitudinal aperture axis; and a latch assembly that includes a latch housing with a longitudinal latch axis and is disposed above the flange, wherein the latch housing is configured and arranged for at least a first and a second rotational orientation, wherein when the latch housing is in the first rotational orientation, the longitudinal latch axis is aligned with the longitudinal aperture axis of the flange and the latch housing is receivable through the aperture of the flange such that the latch housing does not restrain an upward displacement of the support plate, and when the latch housing is in the second rotational orientation, the longitudinal latch axis is transverse to the longitudinal aperture axis and the latch housing is not receivable through the flange such that the latch housing restrains the upward displacement of the support plate, and an upper surface of the flange includes an indent, and when the latch housing is in the second rotational orientation, the indent receives at least a portion of the latch housing that projects from a lower surface of the latch housing, and when received by the indent, the portion of the latch housing that projects from the bottom surface of the latch housing resists a rotation of the latch housing away from the second rotational orientation.

12. The nuclear reactor system of claim 11, further comprising a core barrel that includes a support block that extends beyond a perimeter of the core barrel, wherein the flange of the support plate is disposed vertically intermediate the support block and the latch housing, and the support block is configured to restrain a downward displacement of the support plate such that when the latch housing is in the first rotational orientation, the support plate is locked to the core barrel.

13. The nuclear reactor system of claim 11, wherein the latch assembly further includes an elongate member that extends through the flange and a main bore of the latch housing, wherein the latch housing is configured and arranged to rotate about the elongate member between the first and the second rotational orientations.

14. The nuclear reactor system of claim 11, wherein a relative angular difference between the first and the second rotational orientations of the latch housing is 90 degrees.

15. The nuclear reactor system of claim 11, further comprising:
a latch mechanism that is at least partially housed within the latch housing and includes at least a spheroidal member, a biasing member that provides a biasing force on the spheroidal member, and a setscrew to adjust a magnitude of the biasing force.

16. The nuclear reactor system of claim 11, further comprising a nut disposed above the latch housing that restrains an upward displacement of the latch housing.

17. The nuclear reactor system of claim 12, wherein the latch assembly further includes an elongate member that extends through the flange and a main bore of the latch housing, wherein the latch housing is configured and arranged to rotate about the elongate member between the first and the second rotational orientations.

18. The nuclear reactor system of claim 17, wherein a relative angular difference between the first and the second rotational orientations of the latch housing is 90 degrees.

19. The nuclear reactor system of claim 18, further comprising:
   a latch mechanism that is at least partially housed within the latch housing and includes at least a spheroidal member, a biasing member that provides a biasing force on the spheroidal member, and a setscrew to adjust a magnitude of the biasing force.

20. The nuclear reactor system of claim 19, further comprising a nut disposed above the latch housing that restrains an upward displacement of the latch housing.

* * * * *